US011578222B2

(12) United States Patent
Xue et al.

(10) Patent No.: US 11,578,222 B2
(45) Date of Patent: Feb. 14, 2023

(54) HIGH ADHESION TIJ INK (71) Applicant: Videojet Technologies Inc., Wood Dale, IL (US)

(72) Inventors: Zheng Xue, Burr Ridge, IL (US); Derek Filko, Bloomingdale, IL (US); Kyle Harvey, Elk Grove Village, IL (US); Michael Kozee, Wheaton, IL (US); Stormi Tindall, Romeoville, IL (US)

( * ) Notice: Subject to any disclaimer, the term of this patent is extended or adjusted under 35 U.S.C. 154(b) by 1052 days.

(21) Appl. No.: 15/760,363

(22) PCT Filed: Aug. 30, 2016

(86) PCT No.: PCT/US2016/049402
§ 371 (c)(1),
(2) Date: Mar. 15, 2018

(87) PCT Pub. No.: WO2017/048499
PCT Pub. Date: Mar. 23, 2017

(65) Prior Publication Data
US 2018/0251650 A1 Sep. 6, 2018

Related U.S. Application Data (60) Provisional application No. 62/218,802, filed on Sep. 15, 2015.

(51) Int. Cl.
*C09D 11/36* (2014.01)
*C09D 11/102* (2014.01)
(Continued)

(52) U.S. Cl.
CPC ............ *C09D 11/36* (2013.01); *C09D 11/102* (2013.01); *C09D 11/106* (2013.01); *C09D 11/328* (2013.01)

(58) Field of Classification Search
CPC ....... C09D 11/12; C09D 11/14; C09D 11/328; B41J 2/175
(Continued)

(56) References Cited

U.S. PATENT DOCUMENTS

2009/0246377 A1 10/2009 Robertson et al.
2010/0328401 A1* 12/2010 Robertson .............. C09D 11/38
347/54
(Continued)

FOREIGN PATENT DOCUMENTS

CN 102574153 A 7/2012
EP 1059340 A1 10/2009
(Continued)

OTHER PUBLICATIONS

PCT/US2016/049402; International Search Report and Written Opinion; dated Nov. 15, 2016, 9 pages.

*Primary Examiner* — Khanh T Nguyen
(74) *Attorney, Agent, or Firm* — Wolter Van Dyke Davis, PLLC; Robert L. Wolter (57) ABSTRACT A thermal ink jet ink composition includes one or more volatile organic solvents, wherein the one or more volatile organic solvents comprise a solvent selected from $C_1$-$C_4$ alcohols, $C_3$-$C_6$ ketones, $C_3$-$C_6$ esters, $C_4$-$C_8$ ethers, and mixtures thereof. The one or more volatile organic solvents are present in an amount at least 60% by weight of the ink composition. The ink composition includes one or more binder resins present in an amount from 1% to 10% by weight of the ink composition, and one or more dyes. If water is present, it is present in amount less than 5% by weight of the ink composition. The ink composition includes less than 2% by weight of any humectant and/or wetting agent with a relative evaporation rate less than 0.3. The ink composition is suitable for use in a thermal ink jet printer.

13 Claims, 1 Drawing Sheet (51) Int. Cl.
 *C09D 11/106* (2014.01)
 *C09D 11/328* (2014.01)
(58) Field of Classification Search
 USPC .......................................................... 347/86
 See application file for complete search history.

(56) References Cited

U.S. PATENT DOCUMENTS

| | | | |
|---|---|---|---|
| 2011/0012954 A1 | 1/2011 | Brown et al. | |
| 2012/0026257 A1 | 2/2012 | Robertson et al. | |
| 2014/0378585 A1* | 12/2014 | Li ........................ | C09D 11/328 524/90 |
| 2015/0109390 A1 | 4/2015 | Selmeczy et al. | |
| 2015/0376430 A1* | 12/2015 | Insulaire ................ | C09D 11/14 428/209 |

FOREIGN PATENT DOCUMENTS

| | | |
|---|---|---|
| WO | 1999020699 A1 | 4/1999 |
| WO | 2011041364 A1 | 4/2011 |

* cited by examiner

HIGH ADHESION TIJ INK

BACKGROUND OF THE INVENTION

Thermal ink jet (TIJ) print heads produce ink droplets from thermal vaporization of the ink solvent. In the jetting process, a resistor is heated rapidly to produce a vapor bubble which subsequently ejects a droplet from the orifice. This process is extremely efficient and reproducible. Modern TIJ print heads for industrial graphics applications are capable of generating uniform drops of 4 pL volume or smaller at frequencies of up to 36 kHz or greater. Typical commercial TIJ devices are specifically designed to vaporize water or solvents that have physical properties close to those of water (e.g. high boiling point, large heat capacity, low molecular weight).

Typical TIJ printers print very well onto porous absorbent or semi-absorbent materials or some kinds of nonporous materials such as those used in controlled pharmaceutical settings. However, as these printing systems are incorporated into a wider variety of production environments, the different kinds of primary packaging materials used-particularly plastic films—require greater versatility from the inks. Also, in many packaging plants, such as food packaging, many different kinds of plastics can be used, sometime interchangeably, and plant operators must have confidence that their printing systems will adapt without the need to change ink types.

Although TIJ printing systems have been available for over 30 years, nearly all of the commercial inks available for thermal ink jet systems have been water-based, i.e. they contain more than 50% water. Such aqueous inks have one or more drawbacks such as long ink dry times or poor adhesion to semi-porous or non-porous substrates such as plastics.

There is a desire for inks with performance characteristics for printing in mass production environments such as short dry times, long decap times and good adhesion when using a TIJ system to print onto semi-porous and non-porous substrates.

BRIEF SUMMARY OF THE INVENTION

The disclosure provides a thermal ink jet ink composition including one or more volatile organic solvents, one or more binder resins, and one or more dyes. The one or more volatile organic solvents are selected from $C_1$-$C_4$ alcohols, $C_3$-$C_6$ ketones, $C_3$-$C_6$ esters, $C_4$-$C_8$ ethers, and mixtures thereof. The one or more volatile organic solvents are present in an amount at least 60% by weight of the ink composition. The ink composition includes one or more binder resins present in an amount from 1% to 10% by weight of the ink composition. If water is present, it is present in amount less than 5% by weight of the ink composition. The ink composition includes less than 2% by weight of any humectant and/or wetting agent with a relative evaporation rate less than 0.3. The ink composition is suitable for use in a thermal ink jet printer.

In another aspect, the disclosure provides a printing system including a thermal ink jet cartridge containing a thermal ink jet ink composition. A thermal ink jet print head is adapted to direct a stream of droplets of the ink composition to a substrate. The thermal ink jet ink composition has a decap time of at least 10 seconds and a dry time of less than 5 seconds on a non-porous substrate when used in the thermal ink jet print head.

The disclosure also provides a thermal ink jet cartridge including a thermal ink jet ink composition.

The thermal ink jet ink composition of the invention has one or more of the following features: short post-printed dry times, good adhesion to substrates, long decap times, and good TIJ printhead material compatibility. Short drying times enable the ink to be printed at high production rates without the need for auxiliary energetic curing mechanisms (e.g., thermal driers) when printed on semi-porous and non-porous substrates. The time that a drop on demand (DOD) inkjet printer can rest and fully recover print quality without user or automated intervention is referred to as the decap time. There are a number of ways to define decap time, but a common way is to define the maximum inter-print resting time at which the first post-rest print is fully legible or decipherable.

Fluids with good material compatibility are defined as those which do not degrade the ability of the TIJ cartridge to fire for some reasonable in-service time period that is meaningful to a customer. Kogation is a build-up on the print resistor that occurs after repetitive firings. The buildup reduces the rate of heat transfer from the resistor to the liquid ink. Kogation can reduce drop weight, change drop trajectory, lower drop velocity, or cause nozzles to become completely inactive. The preferred ink composition is one that has a slow rate of resistor buildup by using suitable binder resins, colorants, and additives.

DETAILED DESCRIPTION OF THE INVENTION

The invention provides a thermal ink jet ink composition comprising one or more volatile organic solvents, one or more binder resins, and one or more colorants. The ink composition preferably includes specific binders that provide improved adhesion to a variety of substrates. In various embodiments, the ink composition includes only small amounts of humectants or wetting agents while still providing acceptable decap times and adhesion. A specific problem that occurs with TIJ inks is that of kogation. Kogation is a residue or build-up that deposits on the TIJ firing resistors during use, thus impeding performance via drop weight reduction, misdirected jets, or in extreme cases causing complete loss of nozzle function. Kogation occurs during high temperatures reached during repetitive resistor heating cycles and is usually attributed to materials or impurities in the ink that decompose, react, or become insoluble under these conditions.

To achieve sufficient adhesion on non-porous plastics, a suitably high level of adhesive resins must be employed in the inkjet formulation. Typically low to medium molecular weight thermoplastic resins are incorporated in high enough proportion relative to the other components in the ink (i.e., colorants, etc.) to allow the ink to adhere and protect the colorants. Sometimes the curable compositions—e.g., UV curable inks—are used. However, all of these approaches are difficult in the sense that TIJ systems are not generally able to jet inks with high viscosities or high solids. If fast drying solvents are used in these inks, it generally lends to poor reliability in production environments and poor print quality; or, even worse, the lack of ability for the TIJ printhead to jet at all.

Furthermore, it is difficult to simply adapt current CIJ inks to become TIJ inks, because of the way that TIJ printheads operate. In the TIJ mechanism, for each individual firing event a thermal bubble is generated emanating from a heating resistor element. It is generally understood that nucleation leads to a superheated fluid state and temperatures can be greater than twice the liquid's boiling temperature (>200° C. in the case of water based inks). Under these conditions, the ink ingredients must remain completely stable and soluble over many tens of thousands of firing events to ensure printer reliability. Many conventional inks fail under these conditions and give rise to precipitation or 'kogation' within the printhead.

In accordance with an embodiment, the thermal ink jet ink composition includes volatile organic solvents selected from $C_1$-$C_4$ alcohols, $C_3$-$C_6$ ketones, $C_3$-$C_6$ esters, $C_4$-$C_8$ ethers, and mixtures thereof. The volatile organic solvents are preferably selected from $C_1$-$C_4$ alcohols, $C_3$-$C_6$ ketones, and mixtures thereof. Examples of $C_1$-$C_4$ alcohols include methanol, ethanol, 1-propanol, 2-propanol, 1-butanol, 2-butanol, and 2-propanol. Examples of $C_3$-$C_6$ ketones include acetone, methyl ethyl ketone, methyl n-propyl ketone, methyl isopropyl ketone, diethyl ketone, methyl n-butyl ketone, methyl isobutyl ketone and cyclohexanone. Examples of $C_4$-$C_8$ ethers include diethyl ether, dipropyl ether, dibutyl ether and tetrahydrofuran. Examples of $C_3$-$C_6$ esters include methyl acetate, ethyl acetate, n-propyl acetate, isopropyl acetate and n-butyl acetate. The solvents structures may be comprised of linear or branched carbon arrangement. The organic solvents, particularly alcohols, ketones, and esters, have an attractive feature that they provide better solvency to common binder resins, penetrate semi- and some non-porous substrate surfaces more readily, and evaporate more quickly than water based inks, thus reducing dry time and improving adhesion. If the substrate is soluble to some extent in the main solvent the adhesion improvements are more substantial. For example, many common plastics such as PET, PVC, and ABS are soluble/swellable in ketones, esters or ethers. Ink containing a high enough proportion of these solvents will adhere well to the surfaces of these plastic materials, while inks that contain high amounts of water or ethanol (even when ketones, esters or ethers may be present in lessor quantities) will not adhere as well.

In particular embodiments the thermal ink jet ink compositions includes, as the volatile organic solvent(s), methyl ethyl ketone, 2-pentanone, ethanol, n-butanol, and mixtures thereof. A particularly preferred embodiment includes a ketone such as methyl ethyl ketone or 2-pentanone as a primary solvent and an alcohol such as ethanol, n-propanol or n-butanol as a secondary solvent. Many commercial inks for non-thermal ink jet applications use methyl ethyl ketone due to its strong solvation properties, preferred surface tension, and fast dry times. Furthermore, from a formulating perspective the solvent strength of methyl ethyl ketone gives methyl ethyl ketone-based inks access to a wide selection of colorants, resins, co-solvents and additives that are unavailable to hydrogen donating solvents, such as alcohols.

The solvent-based thermal ink jet inks disclosed herein preferably have viscosities below 5 cPs, preferably below 3 cPs, and more preferably below 2 cPs at 25° C. Lower viscosities and overall ink solids are preferred in TIJ for consistent jetting and relatively fast dry times. Many methyl ethyl ketone-based inks that are optimized for other ink jet technologies (such as continuous ink jet (CIJ) or drop-on-demand (DOD)) jet poorly or not at all in thermal ink jet cartridges. Existing CIJ inks use high resin solids or relative high proportions of high molecular weight resins to deliver proper jetting conditions and suitable substrate adhesion. Such inks contain high overall solids (as compared with what is required for TIJ) and are thus relatively high viscosity (2 to 5 cPs at 25° C.) and slower drying. However, simply diluting an existing CIJ or DOD inkjet inks does not lead to a successful TIJ ink. Even adjusting the viscosity to the preferred value will results in inks that generally exhibit very short decap times (less than 5 seconds), which renders them too difficult to operate in production environments. TIJ printers that use inks with very short decap times would require too much user intervention in the form of cleaning or purging the nozzles to recover good print quality. Without being bound by theory, it is believed that most high molecular weight polymers when used at levels that are typically found in commercial CIJ inks impede overall decap performance. Furthermore, some resins simply due to the nature of their structures do not lend to good decap.

Also important when formulating TIJ inks is screening of materials for potential kogation. Many common materials used in CIJ inks such as thermally unstable resins, conductive salts, adhesion promotors, and the like will lead to kogation that will cause unrecoverable nozzle blockages and premature cartridge failure.

The total amount of the one or more volatile organic solvents can be in any suitable amount, for example, in an amount 50% or more, about 60% or more, about 70% or more, about 80% or more, or about 90% or more by weight of the ink jet ink composition. In an embodiment, the total amount of one or more volatile organic solvents can be present in an amount from 50% to about 99%, preferably from about 60% to about 95%, and more preferably from about 70% to about 90% of the ink jet ink composition. In one embodiment, if water is present in the thermal ink jet ink composition, it is present in an amount less than 50% by weight, less than about 25% by weight, less than about 10% by weight, less than about 5% by weight, or less than about 2% by weight of the ink jet ink composition.

In an embodiment, the one or more volatile organic solvents include methyl ethyl ketone or 2-pentanone and one or both of ethanol and n-butanol. The methyl ethyl ketone may be present in an amount up to 90% by weight, up to 85% by weight, or up to 80% by weight of the ink jet ink composition. The methyl ethyl ketone or 2-pentanone may be present in an amount of at least 60% by weight, at least 70% by weight, or at least 75% by weight of the ink jet ink composition. In embodiments, the ethanol or n-butanol may be present in an amount up to 40% by weight, up to 30% by weight, or up to 20% by weight of the ink jet ink composition. In embodiments, the ethanol or n-butanol may be present in an amount of at least 5% by weight, at least 10% by weight, or at least 15% of the ink jet ink composition.

The thermal ink jet ink composition can include any suitable colorant or colorants, which may be dye or pigment. In an embodiment, one or more dyes are employed as the colorant, wherein the one or more dyes are selected from the group consisting of acid dyes, basic dyes, solvent dyes, disperse dyes, mordant dyes, reactive dyes and any combination thereof. Examples of solvent dyes include naphthol dyes, azo dyes, metal complex dyes, anthraquinone dyes, quinoimine dyes, indigoid dyes, benzoquinone dyes, carbonium dyes, naphthoquinone dyes, naphthalimide dyes, phthalocyanine dyes, nigrosine dyes and perylene dyes.

For example, the thermal ink jet ink composition can include one or more dyes selected from the group consisting of C.I. Solvent Yellow 19, C.I. Solvent Yellow 21, C.I. Solvent Yellow 61, C.I. Solvent Yellow 80, C.I. Solvent Orange 1, C.I. Orange 37, C.I. Orange 40, C.I. Solvent Orange 54, C.I. Solvent Orange 63, C.I. Solvent Red 8, Solvent Red 49, C.I. Solvent Red 81, C.I. Solvent Red 82, C.I. Solvent Red 84, C.I. Solvent Red 100, C.I. Acid Red 92, C. I. Reactive Red 31, Orient Pink 312, C.I. Basic Violet 3, C.I. Basic Violet 4, C.I. Solvent Violet 8, C.I. Solvent Violet 21, C.I. Solvent Blue 2, C.I. Solvent Blue 5, C.I. Solvent Blue 11, C.I. Solvent Blue 25, C.I. Solvent Blue 36, C.I. Solvent Blue 38, C.I. Solvent Blue 55; C.I. Solvent Blue 70, C.I. Solvent Green 3, C.I. Solvent Black 3, C.I. Solvent Black 5, C.I. Solvent Black 7, C.I. Solvent Black 22, C.I. Solvent Black 26, C.I. Solvent Black 27, C.I. Solvent Black 29 (VALIFAST BLACK 3808 or ORASOL BLACK RLI™), C.I. Acid Black 123, C.I. Solvent Black 48 (MORFAST BLACK 101™), C.I. Oil Blue 613, and any combination thereof, and preferably one or more dyes selected from the group consisting of C.I. Solvent Black 29 (ORASOL BLACK RLI™), C.I. Solvent Black 27, C.I. Solvent Black 48, C.I. Solvent Black 3 (Oil Black 860), C.I. Basic Violet 3, C.I. Solvent Blue 38, C.I. Solvent Blue 70, C.I. Oil Blue 613, C.I. Solvent Red 49 (ORIENT PINK™ 312), C.I. Solvent Orange 54 (VALIFAST ORANGE™ 3210), and any combination thereof.

Any suitable pigment can be used, for example, one or more pigments selected from the group consisting of phthalocyanine blue, carbon black, mars black, quinacridone magenta, ivory black, prussian blue, cobalt blue, ultramarine blue, manganese blue, cerulean blue, indathrone blue, chromium oxide, iron oxides, viridian, cobalt green, terre verte, nickel azo yellow, light green oxide, phthalocyanine greenchlorinated copper phthalocyanine, burnt sienna, perinone orange, irgazin orange, quinacridone magenta, cobalt violet, ultramarine violet, manganese violet, dioxazine violet, zinc white, titanium white, flake white, aluminum hydrate, blanc fixe, china clay, lithophone, arylide yellow G, arylide yellow 10G, barium chromate, chrome yellow, chrome lemon, zinc yellow, cadmium yellow, aureolin, naples yellow, nickel titanate, arylide yellow GX, isoindolinone yellow, flavanthrone yellow, yellow ochre, chromophthal yellow 8GN, toluidine red, quinacridone red, permanent crimson, rose madder, alizarin crimson, vermilion, cadmium red, permanent red FRG, brominated anthranthrone, naphthol carbamide, perylene red, quinacridone red, chromophthal red BRN, chromophthal scarlet R, aluminum oxide, bismuth oxide, cadmium oxide, chromium oxide, cobalt oxide, copper oxide, iridium oxide, lead oxide, manganese oxide, nickel oxide, rutile, silicon oxide, silver oxide, tin oxide, titanium oxide, vanadium oxide, zinc oxide, zirconium oxide, and any combination thereof.

In embodiments, the pigments are selected from the group consisting of azo pigments, phthalocyanine pigments, quinacridone pigments, dioxazine pigments, isoindolinone pigments, metal oxide pigments, carbon black, and any combination thereof. The pigments can have any suitable particle size, for example, from about 0.005 micron to about 15 microns, preferably from about 0.005 to about 1 micron, and more preferably from about 0.01 to about 0.3 micron.

In any of the embodiments, the colorant, dye or pigment, can be present in an amount from about 0.01% to about 10%, preferably from about 0.5% to about 7%, and more preferably from about 1% to about 5% by weight of the ink jet ink composition.

In any of the embodiments, either no humectants or only small amounts of humectants are used. Humectants or wetting agents are additives which maintain a wet environment in the vicinity of the ink jet nozzle during the evaporation process, thus extending the decap time. Preferably, humectants have a boiling point greater than 160° C., greater than 200° C., or greater than 250° C., and/or a relative evaporation rate (with n-butyl acetate=1) less than 1.0, less than 0.9, less than 0.7, less than 0.4, less than 0.3, less than 0.1, or less than 0.01. The ink composition preferably includes less than 2% by weight, less than 1% by weight, less than 0.5% by weight, or is substantially free of any humectant and/or wetting agent with a boiling point greater than 160° C. and/or a relative evaporation rate less than 0.3. More preferably, the ink composition preferably includes less than 1% by weight of any humectant and/or wetting agent with a relative evaporation rate less than 0.3. In another embodiment, the ink composition is free or substantially free of any humectant and/or wetting agent with a relative evaporation rate less than 0.3. In another embodiment, the ink composition preferably includes less than 2% by weight, less than 1% by weight, less than 0.5% by weight, or is substantially free of any humectant and/or wetting agent with a vapor pressure less than 5 mm Hg.

The humectants typically are solvents having one or more polar functional groups such as hydroxyl, ether, amide, ester, ketone, and carbonate, for example, two functional groups, which may be the same or different, such as two hydroxyl groups or one hydroxyl group and one ether group. In an embodiment, the one or more humectants, if present, are selected from the group consisting of polyols, glycol ethers, glycol ether acetate, diacetone alcohol, 2-pyrrolidinone, N-methylpyrrolidinone, ethyl lactate, butyl lactate, propylene carbonate, 1,3-dimethyl-2-imidazolidindione, and alkyl esters, and any combination thereof.

In one embodiment, the ink composition includes less than 2% by weight, less than 1% by weight, less than 0.5% by weight, or is substantially free of, any humectant selected from polyols, glycol ethers, glycol ether acetate, diacetone alcohol, 2-pyrrolidinone, N-methylpyrrolidinone, ethyl lactate, butyl lactate, 1,3-dimethyl-2-imidazolidindione, propylene carbonate, alkyl esters, and mixtures thereof.

If present, the polyol may be selected from polyethylene glycol, polypropylene glycol, poly(ethylene-co-propylene glycol), trimethylol propane, ethylene glycol, glycerin, diethylene glycol, triethylene glycol, tripropylene glycol, tetraethylene glycol, pentaethylene glycol, 1,2-propylene glycol, 1,3-propanediol, butylene glycol, triethylene glycol, 1,2,6-hexanetriol, thiodiglycol, hexylene glycol, bis-2-hydroxyethyl ether, 1,4-butanediol, 1,2-butenediol, 1,4-butenediol, 1,3-butenediol, 1,5-pentanediol, 2,4-pentanediol, 2,4-heptanediol, 1,8-octanediol, 1,10-decanediol, 1,12-dodecanediol, 1,4-cyclohexanediol, 1,4-cyclohexanedimethanol, 1,2-bis(hydroxymethyl)cyclohexane, 1,2-bis(hydroxyethyl)-cyclohexane, 3-methyl-1,5-pentanediol, 2,2,4-trimethyl-1,3-pentanediol, neopentyl glycol, pentaerythritol, sorbitol, mannitol, and any combination thereof, and preferably the polyol is selected from the group consisting of polyethylene glycol, trimethylol propane, ethylene glycol, propylene glycol, glycerin, diethylene glycol, tripropylene glycol, and any combination thereof.

A preferred humectant, if a humectant is present, is glycol ether, for example, a glycol ether selected from the group consisting of ethylene glycol monomethyl ether, ethylene glycol monoethyl ether, propylene glycol monomethyl ether, tripropylene glycol monomethyl ether, ethylene glycol monobutyl ether, diethylene glycol monomethyl ether, diethylene glycol monoethyl ether, propylene glycol n-propyl ether, propylene glycol t-butyl ether, propylene glycol n-butyl ether, dipropylene glycol methyl ether, dipropylene glycol n-propyl ether, dipropylene glycol t-butyl ether, dipropylene glycol n-butyl ether, tripropylene glycol n-propyl ether, tripropylene glycol t-butyl ether, tripropylene glycol n-butyl ether, ethyl cellosolve, methyl cellosolve, polyethylene glycol monomethyl ether, polypropylene glycol monomethyl ether, methoxytriglycol, ethoxytriglycol, butoxytriglycol, 1-butoxyethoxy-2-propanol, ethylene glycol phenyl ether, propylene glycol phenyl ether, diethylene glycol phenyl ether, polyethylene glycol phenyl ether, and any combination thereof, and preferably, the glycol ether is selected from the group consisting of ethylene glycol monomethyl ether, ethylene glycol monoethyl ether, propylene glycol monomethyl ether, propylene glycol monopropyl ether, tripropylene glycol monomethyl ether, ethylene glycol monobutyl ether, diethylene glycol monomethyl ether, diethylene glycol monoethyl ether, and any combination thereof. In certain embodiments, propylene glycol monopropyl ether (Dowanol™ PnP) is a preferred humectant. In other embodiments, propylene glycol monomethyl ether (Dowanol™ PM) is a preferred humectant. In other embodiments, diacetone alcohol is a preferred humectant.

Humectants may improve, at least in part, to the decap time of the thermal ink jet ink composition. However, the present ink composition has been found to produce acceptable decap times without any humectants, as defined herein. Humectants can lengthen decap times of the ink jet ink composition; however, excessive amounts of humectants could increase the dry time and the ability for the ink to develop adhesion (i.e., rub resistance) soon enough after printing. If present, the one or more humectants can be present, for example, in an amount about 5% by weight or less, about 4% by weight or less, about 3% by weight or less, about 2% by weight or less, or about 1% by weight or less, of the ink composition.

A preferred property of the resins is compatibility with the combined solvents used in the inks. For example, for ketone and alcohol blends, the resins should ideally also have high bulk solubility and/or a high cloud point in alcohol blends. As discussed, the thermal ink jet ink composition includes one or more binder resins. Any suitable binder resin, soluble or dispersible, can be employed, preferably a solvent soluble binder resin. In an embodiment, the thermal ink jet ink composition includes one or more binder resins selected from the group consisting of cellulose ester resins, polyamide resins, polyurethane resins, rosin ester resins, acrylic resins, polyvinyl butyral resins, polyesters, phenolic resins, vinyl resins, styrene/acrylate copolymers, cellulose ethers, cellulose nitrate resins, polymaleic anhydrides, acetal polymers, styrene/butadiene copolymers, styrene/methacrylate copolymers, sulfonated polyesters, sulfonamide-modified epoxy resins, sulfonamide-modified formaldehyde resins, sulfonamide-modified melamine formaldehyde resins, aldehyde resins, polyhydroxystyrene resins and polyketone resins, and any combination thereof, and preferably one or more binder resins selected from the group consisting of cellulose nitrate resins, polyamide resins, rosin ester resins, acrylic resins, polyvinyl butyral resins, vinyl resins, polyhydroxystyrene resins, sulfonamide-modified epoxy resins, sulfonamide-modified formaldehyde resins, sulfonamide-modified melamine formaldehyde resins, and any combination thereof. Examples of cellulose nitrate resins are NOBEL DHX 3-4, DLX or DHX 3-5 or NOBEL™ DHX 5-8, available from Nobel Enterprises. Examples of polyvinyl butyral resins are PIOLOFORM™ BN18, available from Wacker Chemie AG, and MOWITAL™ B20H available from Kuraray America, Inc. Examples of acrylic and styrene/acrylic resins are Joncryl 611, 682, and 586 (available from BASF, USA); DM-55, Paraloid B-66, andB-72 (available from Dow Chemical, USA); and Elvacite 2013 and 4055 (available from Lucite Inc.). Examples of vinyl resins include UCAR VYHH, VMCH, YMCA, and VAGF (available from Dow Chemical Company, USA; equivalent replacement resins from other suppliers) and Vinnol™ E15/45, E15/40A, H14/36, E15/45M, and E16/40A (available from Wacker Chemie AG, Germany). Examples of polyhydroxystyrene resins include poly(p-hydroxy styrene) from DuPont. An example of a sulfonamide-modified epoxy resin is AD-PRO MTS, available from Rit-Chem. Examples of sulfonamide-modified formaldehyde resins are P-TOLUENE SULFONAMIDE FORMALDEHYDE RESIN, available from Jiaxing Chenlong Chemical Company, Ltd. and RIT-O-LITE MHP, available from Rit-Chem. An example of a suitable polyamide resin is ARIZONA 201-150™ available from Arizona Chemical Company, Jacksonville, Fla., or COGNIS VERSAMID 756™, available from Cognis GmbH, Monheim am Rhein, Germany, both of which are alcohol-soluble polyamide resins. The ink composition may include one, two, three, or more resins.

Preferred resin combinations for excellent adhesion include the specific combinations of tackifying resins with one or more of the following: cellulose ester resins; sulfonamide-modified epoxy resins; rosin ester resins; terpene phenolic resins; polyurethanes and, acrylic resins. A particularly preferred combination is that of cellulose ester resins and rosin ester and/or terpene phenolic resins. A second preferred combination is that of sulfonamide-modified epoxy resins, cellulose ester resins and rosin ester and/or terpene phenolic resins. An example of a suitable cellulose ester resin is a butyrated variety, CAB 551-0.01, available from Eastman Chemical. The cellulose ester resin preferably has a weight average molecular weight less than 50,000 and a glass transition temperature less than 160° C. A third particularly preferred combination is that of sulfonamide-modified epoxy resins and rosin ester and/or terpene phenolic resins. A fourth particularly preferred combination is that of sulfonamide-modified epoxy resins, a polyurethane and a rosin ester and/or terpene phenolic resins. These resins and the specified combinations, as exemplified by compatibility with alcohols, will form good films when the formulations are primarily comprised of esters, ethers, or ketones with lessor proportions of alcohols.

Preferred types of polyurethanes are of the flexible variety with relatively low molecular weight that are produced by the reaction of polyols and diisocyanates. Examples of polyols include ethylene glycol, propylene glycol, propanediol, butanediol, polyethylene glycol, polypropylene glycol, polyethylene glycol adipate diol, polyethylene glycol succinate diol, polytetrahydrofuran diol, and the like. Examples of diisocyanates include 2,4-tolylene diisocyanate, 2,6-tolylene diisocyanate, 4,4,-diphenylmethane diisocyanate, hexamethylene diisocyanate, and the like. Polyurethanes having molecular weight in the range of about 3,000 to about 50,000 are preferred and polyurethanes having molecular weight in the range of about 3,000 to about 15,000 are even more preferred.

Preferred classes of tackifying resins are rosin esters or terpene phenolic resins. Hydrogenated terpene phenolic resins are also suitable. General examples of terpene phenolic resins include those from Arakawa Chemical (Tamanol); Arizona Chemical (Sylvares™); DRT (Dertophene™); SI Group (SP); and, Yasuhara Chemical (YS Polyster). Preferred specific examples include low hydroxyl number terpene phenolic resins such as Dertophene™ T, available from DRT, Inc., and SP-553 available from SI Group, Inc. Examples of preferred medium hydroxyl number terpene phenolic resins include Tamanol 803L from Arakawa Specialty Chemicals, Inc., and YS Polyster T145 from Yasuhara Chemical Co., Ltd. A preferred example of hydrogenated terpene phenolic resin is YS Polyster UH115 from Yasuhara Chemical Co., Ltd.

Suitable rosin esters are gum rosins, wood rosins or tall oil rosins or modified versions thereof. Hydrogenated forms are generally preferred due to their relative stability. General examples of hydrogenated rosin esters include those from Arizona Chemical (Uni-tac), Eastman Chemical (Foral™, Staybelite™, Pentalyn™-H); and, Arakawa chemical (Superester). Non-hydrogenated varieties are suitable including those from Eastman (Pentalyn™, Pexalyn™, etc.); Arakawa (Pensel, etc.); and, Arizona Chemical (Sylvateac, Sylvalite™, etc.). Preferred specific examples include low acid number, apolar varieties such as Foral™ AX and STAYBELITE™ ESTER 10, available from Eastman Chemical, Inc., and Superester A-75 from Arakawa Specialty Chemicals, Inc. An example of a preferred wood rosin ester resins is UNIREZ™ 8115, available as a 40% solution in ethanol from Penn Color, Doylestown, Pa., which is a hydrogenated wood rosin ester. Other tackifying resins that might be suitable include the classes of polyterpene resins (d-limonene, alpha and/or beta pinene, etc.) and hydrocarbon resins.

It has been found that by using binder resins with certain properties, the amount of kogation can be reduced. Kogation is a residue or build-up that deposits on the thermal ink jet firing resistors during use, thus impeding performance via drop weight reduction, misdirected jets, or, in extreme cases, complete loss of nozzle function. Kogation occurs during the high temperatures reached during repetitive resistor heating cycles and is usually attributed to materials in the ink that decompose, react, or become insoluble under these conditions. It has been found that by using binder resins with good solubility properties in the solvent, the effects of kogation can be greatly minimized. In particular, it has been found that certain resins are less prone to kogation in alcohol-based inks; such resins include polyhydroxystyrene, styrene/acrylic resins, rosin ester resins, synthetic ketone resins, sulfonamide-modified formaldehyde resins and sulfonamide-modified epoxy resins. For ketone-based inks, polymers which are less prone to kogation include cellulose esters, nitrocellulose resins, acrylic resins, polyester resins, styrene/acrylic resins, urethane resins, rosin ester resins, vinyl chloride/acetate copolymers, silicone resins, sulfonamide-modified formaldehyde resins and sulfonamide-modified epoxy resins.

Kogation may be determined by measuring the drop weight of ink ejected from the nozzles. The onset of kogation can be defined as a consistent reduction in drop weight of greater than 10% from the initial drop weight after 5, 10, 15, 20, 25, or 45 million drops per nozzle actuations. The drop weight loss is measured by jetting a fixed number of drops for a select subgroup of nozzles and monitoring the mass with a high precision scale after each cycle. This process is repeated until the desired level (e.g., 10, 25, or 45 million drops per nozzle level) or higher is reached. A drop weight tester (available from ImTech, Inc., Corvallis, Oreg.) may be used to perform these measurements. The thermal ink jet ink compositions disclosed herein preferably resist kogation such that they can be printed at greater than 10 million drops per nozzle before significant kogation occurs, and more preferably greater than 15 million drops per nozzle, and even more preferably greater than 25 million drops per nozzle.

The polymeric binder resin can be present in any suitable amount, for example, in an amount from about 0.1% to about 30%, preferably from about 0.2% to about 15%, and more preferably from about 1% to about 10% or about 1% to about 8% by weight of the ink jet ink composition. The polymeric binder resin can be present in an amount less than 12%, less than 10%, or less than 8% by weight of the ink composition. In a preferred embodiment, the ink composition includes a cellulose ester resin in an amount 0.1% to 3% by weight of the ink composition and a rosin ester in an amount 1% to 8% or to 10% by weight of the ink composition. The polymeric binder resin may have a weight average molecular weight ($M_w$) of less than 250,000, less than 100,000, less than 50,000, less than 25,000, less than 10,000, less than 5000, and less than 3000. While not intending to be bound by theory, it is believed that resins with lower molecular weights tend to re-dissolve more readily and tend to have better decap time and are less prone to kogation when compared to higher molecular weight resins in the same solvent mixtures. Alternatively, sulfonamide-modified polymers resist kogation irrespective of molecular weight. While not intending to be bound by theory, the sulfonamide group may passivate the resistor surface and thus form a barrier that impedes kogation.

In a particular embodiment of the thermal ink jet ink composition, the volatile organic solvent or solvents can be present in an amount from about 50% to about 95% by weight, the colorant(s) (dyes, pigments, or a combination thereof), can be present in amount from about 1% to about 10% by weight or from about 1% to about 8% by weight, and the binder resin can be present in an amount from about 1% to about 10% by weight of the ink jet ink composition.

The thermal ink jet ink composition can further include one or more additives such as surfactants, and plasticizers. Preferably, a polymeric surfactant is employed that is soluble at some active level in the ink solvents. Examples of surfactants include polysiloxanes, modified polysiloxanes, alkyl modified polyoxyalkyleneamines, alkyl modified propoxylated (poly(oxypropylene)) diamines, alkyl ether amines, nonyl phenol ethoxylates, ethoxylated fatty amines, fluorinated organic acid diethanolamine salts, alkoxylated ethylenediamines, alkyl modified polyethylene oxides, alkyl modified polyalkyleneoxides, alkyl phosphate ethoxylate mixtures, polyoxyalkylene derivatives of propylene glycol, hydrophobe modified ethoxylated acetylenic diols, secondary alcohol ethoxylates, tall oil fatty acid ethoxylates, simple alcohol ethoxylates, modified perfluoropolyethers (with polyalkyl, alkyl amide, carboxylic acid, alcohol, alcohol ethoxylate, phosphate, ester, silane or polyol modifications), fluoroalkyl and modified versions (i.e., alkyl/fluoroalkyl), and polyoxyethylated fatty alcohols. A specific example of a suitable polymeric surfactant is Silicone Fluid SF-69, available from General Electric, which is a blend of silanols and cyclic silicones. Specific examples of siloxane polyalkyleneoxide copolymer surfactants include SILWET L-7622™ which is a (Momentive Performance Chemicals, USA) and DC205 from Dow Corning. Examples of fluorosurfactants suitable for thermal inkjet compositions include: Novec™ 4430 and Novec™ 4432 (available from 3M); Zonyl™ FSN, Zonyl™ FSH, Capstone FS-34, Capstone FS-35, Capstone™ FS-3100 and Capstone™ FS-22 (available from DuPont). Examples of alcohol ethoxylates include Makon DA-4, DA-6 and DA-9 from Stepan.

In any of the embodiments, the surfactants can be present in an amount from about 0.01 to about 2.0%, preferably from about 0.02 to about 1%, and more preferably from about 0.03 to about 0.5% of the ink jet ink composition.

Examples of suitable plasticizers are ones that exhibit no volatility (i.e., very high boiling point>250° C. and non-measurable or negligible vapor pressures at standard atmospheric conditions). These include examples from any of the classes: phthalate; long chain or aryl modified esters such as diadipate, benzoate, citrate, myristate, maleate, sevacate, acetate-esters; tri-n-hexyltrimellitate; phosphates; polyurethanes; oils (i.e., soybean oil); and, sulfonamide plasticizers such as Plasticizer 8, available from Monsanto Co., St. Louis, Mo., which is n-ethyl o,p-toluene sulfonamide.

In certain embodiments, the plasticizer can be present in an amount from about 0.1 to about 5.0%, preferably from about 0.2 to about 3.0%, and more preferably from about 0.25 to about 2.0% of the ink jet ink composition.

The thermal ink jet ink composition may include additional ingredients such as bactericides, fungicides, algicides, sequestering agents, buffering agents, corrosion inhibitors, antioxidants, light stabilizers, anti-curl agents, thickeners, dispersing agents, conductive salts, and other agents known in the relevant art. In an embodiment, the ink composition is free or substantially free of antioxidants.

The thermal ink jet ink composition can have any suitable viscosity or surface tension. In embodiments of the invention, the thermal ink jet ink composition has a viscosity of less than about 10 cPs, preferably less than about 5 cPs, more preferably less than about 3 cPs, and most preferably less than about 2 cPs, for example, a viscosity from about 0.6 to 4 or from about 0.6 to about 3 cPs at 25° C. In embodiments of the invention, the thermal ink jet ink composition has a surface tension from about 20 to about 50 mN/m, from about 21 to about 40 mN/m, or from about 22 to about 30 mN/m at 25° C. The solids content of the thermal inkjet ink composition may be less than 20% by weight, and is preferably less than 15% by weight.

The thermal ink jet ink composition can be prepared by any suitable method. For example, the chosen ingredients can be combined and mixed with adequate stirring and the resulting fluid filtered to remove any undissolved impurities.

The thermal ink jet ink composition has one or more attractive features such as short unassisted dry times of printed alphanumeric or graphic images, long decap times, good adhesion to semi-porous and non-porous substrates, safety, and material compatibility with one or more components of a thermal ink jet printer. In particular, it is desirable that the thermal ink jet ink composition have both a short dry time and a long decap time. For example, embodiments of the thermal ink jet ink composition have a dry time of about 10 seconds or less, such as 7 seconds or less, 5 seconds or less, 4 seconds or less, or 2 seconds or less, on non-porous substrates under ambient conditions. Non-porous substrates include materials such as plastics, metals, glass, and glossy paper. On porous substrates, the dry times are shorter than in semi- or non-porous substrates. For example, embodiments of the thermal ink jet ink composition have a dry time of about 1 second on porous substrates and less than about 5 seconds, preferably less than about 2 seconds, and more preferably less than about 1 second on semi-porous substrates. The thermal ink jet ink composition preferably has a decap time of at least 10 seconds, at least 15 seconds, at least 30 seconds, at least 45 seconds, at least 60 seconds, or at least five minutes, when used in a thermal ink jet print head. In a preferred embodiment, the thermal ink jet ink composition has a decap time of at least 10 seconds and a dry time of less than 3 seconds on non-porous substrates when used in a thermal ink jet print head. Dry times are typically assessed by lightly rubbing a freshly printed image (such as a 0.5 inch square Datamatrix barcode) with a clean finger and looking for any signs of smearing. The dry time is the longest test time point at which no signs of smearing are noted.

As stated above, the maximum time that a drop on demand (DOD) inkjet printer can rest and recover print quality without user or automated intervention is referred to as the decap time. Interventions are undesirable, for example, when a human user must spend valuable time to restore good print quality by hand-wiping a printhead or when a printing system necessitates a production stop using automated cleaning to restore print quality, such as by printing ink into a spittoon. There are a number of ways to define decap time, but a common way is to define the maximum inter-print resting time up to and including which the first post-rest print is fully decipherable or readable. Machine decipherability is an unbiased way to assess readability and can be defined as the ability of a specific machine reader under controlled conditions to read a particular bar code. To perform such a decipherability test, a thermal inkjet printer prints codes onto aqueous coated white cards with different decap periods employing defined printing parameter (e.g., frequency, voltage and pulse width). A first 2-D barcode is printed to ensure that all of the nozzles are working and then a second 2-D code is printed at the test decap time. By increasing the decap wait time after the first 2-D code, a series of second codes with at different decap test times are generated (for example, with wait times of 5, 7, 9, 11, 13, 15, 20, 25, 30, 40, 50, 60, 75, and 90 seconds). Second code samples are then evaluated by reading them on, for example, an LVS Barcode scanner (Integra model #9505). An overall grade of 'C' or better is considered acceptable.

Alternatively, the codes can be visually assessed for loss of print quality, often called column dropout. The latter method is more subjective, but is the time point at which about 20% of printed drops of a specified image is misplaced or missing from the image. This signifies the point where some first alphanumeric characters in an image might be unreadable to some people. A specific example of a decap time measurement is the maximum amount of resting time a system can undergo and still recover full nozzle function within the first 20% of a printed stairstep image (i.e. 80% of the print is intact).

TIJ printers are exceptionally easy to maintain, and TIJ systems can deliver a high quality image consistently in part because the printheads, which contain the printing nozzles, can be rapidly and easily swapped by untrained production personnel. However, conventional TIJ ink jet printers are incompatible with inks that dry too quickly. The nozzles are arranged in a close-packed array. A reservoir of printing fluid or ink is upstream of the nozzles and the fluid is fed to the nozzles by pumping, gravity feeding or capillary action. The reservoir can be enclosed within and essentially sealed from the environment; however, due to the fact that the nozzles remain open at all times, the ink that rests within the nozzle orifices is exposed to open air and as such its properties can become altered due to influences of heat, air currents, debris and the like.

Decap periods may be effectively increased by using engineered methods to cover the inkjet nozzle array. One way to accomplish this is by using an offline capping station to protect the nozzles during periods of production downtime. More preferably, systems that incorporate such capping mechanisms within the printhead itself enable the use of highly volatile industrial inkjet inks without the need to delay production by keeping the printhead fixed in position on the production line. The Videojet 8610 Thermal Inkjet System from Videojet Technologies Inc., for example, can incorporate a physical cap that opens and retracts automatically and covers the entirety of its nozzle array when printing ceases. The cap interval may be set to close automatically within, for example, 10 seconds. Inks that can meet a decap time of 10 seconds will deliver good first-code print quality up to 10 seconds with the cap open and then after any reasonably wait period (i.e., 15 seconds, 1 minute, 8 hours, or 72 hours or more) thereafter after the cap re-opens. By incorporating such a cap, the ink is not allowed to dry excessively and the effective decap time of the ink is greatly increased in a manner that is transparent to most users.

The thermal ink jet ink composition may be used in any suitable thermal ink jet cartridge. The thermal ink jet cartridge is preferably fashioned from materials that are resistant to the solvents used in the thermal ink jet ink composition. Generally as the proportion of aggressive ketone, ester, or ether solvents (as described above) are increased to levels where they are the predominant solvent in the ink, the ink cartridge, which is composed primarily of plastics, lithographically formed structures and cured adhesives, may become susceptible to break-down such as solubilizing, melting of components, permeation of fluids through structural barriers, swelling, or delamination of layers, or the like. Suitable thermal ink jet cartridges are available commercially as part of the Videojet 8610 Thermal Inkjet Printer from Videojet Technologies Inc. and disclosed in U.S. Pat. No. 8,091,993B2, entitled "INK CONTAINMENT SYSTEM AND INK LEVEL SENSING SYSTEM FOR AN INKJET CARTRIDGE," and U.S. Pat. No. 8,454,149B2, entitled "THERMAL INKJET PRINT HEAD WITH SOLVENT RESISTANCE," with a publication date of Dec. 30, 2010, the contents of which are hereby incorporated by reference. The present disclosure further provides a method for printing images on a substrate in a thermal ink jet printer comprising directing droplets of any of the embodiments of the thermal ink jet ink composition to a substrate and allowing the ink droplets to dry, thereby printing images on a substrate.

As stated above, the substrate versatility of the inventive inks is very wide and accommodates a broad range of production needs. Any suitable substrate can be printed in accordance with the invention. Examples of suitable substrates include porous substrates such as uncoated paper, semi-porous substrates such as aqueous coated paper, clay coated paper, silica coated paper, UV overcoated paper, polymer overcoated paper, and varnish overcoated paper, and non-porous substrates such as hard plastics, polymer films, metals, glass, coated foils, polymer laminates, foil laminates, and ceramics. The paper substrates can be thin sheets of paper, rolls of paper, or cardboard. Plastics, metals, glass, foils, laminates and ceramic substrates can be in any suitable form such as in the form of bottles or containers, plates, rods, cylinders, etc.

Examples of polymer coating include a coating of polystyrene, polyvinyl alcohol, polyacryate, polymethacrylate, polystryrene or polyvinyl chloride. Examples of polymer film substrates include polyvinyl butyrals, polyolefins, polyvinyl chloride, polyethylene terephthalate, PETG, PETE, polybutylene terephthalate (PBT), polyester, polycarbonate, acrylonitrile-butadiene-styrene (ABS) copolymer, polyvinyl fluoride polymer, polyamides, polyimides, and cellulose. Plastics can be treated plastics (e.g. chemical etch, corona discharge, flame plasma, etc.) or untreated plastics. Examples of metals include aluminum, copper, stainless steel, and metal alloys. Examples of ceramics include oxides, nitrides, and carbides of metals.

Plastics employed in food packaging, particularly flexible food packaging, are particularly important. A variety of flexible plastics are used such as polyester, polyethylene (LDPE and HDPE), but the most common classes are oriented polypropylene-based materials (OPP, BOPP) that typically comprise the outer, printed layer of multilayer barrier films. Besides being common, BOPP represents a difficult class of plastics on which to achieve good durability.

The following examples further illustrate the invention but, of course, should not be construed as in any way limiting its scope.

COMPARATIVE EXAMPLES

This example illustrates comparative examples of conventional continuous ink jet formulations. The ink compositions of each of the Comparative Examples were provided in a conventional thermal ink jet cartridge to attempt to jet the inks. Three commercial CIJ ink compositions from Videojet Technologies Inc. (16-8200, 16-8470 and 16-8530) jetted very poorly or not at all or have decap time of less than 5 seconds in the thermal ink jet cartridge. Thus, it can be seen that conventional continuous ink jet ink compositions are not suitable for use in thermal ink jet cartridges.

Example 1

This example illustrates embodiments of the thermal ink jet ink composition using methyl ethyl ketone as the solvent. The materials employed in preparing the ink jet ink composition, their amounts in percentage, and the formulation numbers are set forth in Table 1 below. Nobel DHX 3-4 is a cellulose nitrate resin with a weight average molecular weight of about 42,000. Joncryl 682 is a styrene/acrylic copolymer with a weight average molecular weight of about 1700. Ad Pro MTS is a sulfonamide-modified epoxy polymer with a weight average molecular weight of about 1700. K-Plast 1022 is a urethane polymer with a weight average molecular weight of about 7500. DC Silicone resin is a silicone resin with a weight average molecular weight of about 2500. Poly 4-hydroxy styrene resin is a branched polymer with a weight average molecular weight of about 2500. Paraloid B-66 is an acrylic polymer with a weight average molecular weight of about 70,000.

TABLE 1

| Material | 11903 | 12217 | 12418 | 12419 | 12461 | 12463 | 12464 | 12465 | 12471 | 12589 | 12721 | 12722 | 12723 | 12745 |
|---|---|---|---|---|---|---|---|---|---|---|---|---|---|---|
| Methyl ethyl ketone | 73.35 | 75.35 | 75.35 | 75.35 | 75.35 | 75.35 | 75.35 | 75.35 | 77.35 | 85.35 | 85.45 | 85.3 | 85.45 | 85.35 |
| Joncryl 682 | | 4 | | | | | | | | | | | | |
| Ad Pro MTS | | | 4 | | | | | | | 4 | 4 | 4 | 4 | 4 |

TABLE 1-continued

| Material | 11903 | 12217 | 12418 | 12419 | 12461 | 12463 | 12464 | 12465 | 12471 | 12589 | 12721 | 12722 | 12723 | 12745 |
|---|---|---|---|---|---|---|---|---|---|---|---|---|---|---|
| K-Plast 1022 | | | | | 4 | | | | 2 | | | | | |
| DC Silicone Resin | | | | | | 4 | 2 | 2 | | | | | | |
| Nobel DHX 3-4 | 2 | | | | | | | | | | | | | |
| poly 4-hydroxy | | 2 | | | | | 2 | | | | | | | |
| Super Ester A-75 | | 2 | | | | | | | | | | | | |
| Paraloid B-66 | | | | | | | | | 2 | | | | | |
| Propasol M | 10 | | | | | | | | | | | | | |
| Propasol P | 10 | 10 | 10 | 10 | 10 | 10 | 10 | 10 | 10 | 6 | 6 | 6 | 6 | 6 |
| Diacetone Alcohol | | 6 | 6 | 6 | 6 | 6 | 6 | 6 | 6 | | | | | |
| Silwet-L7622 | 0.10 | 0.1 | 0.1 | 0.1 | 0.1 | 0.1 | 0.1 | 0.1 | 0.1 | 0.1 | | | | 0.1 |
| Silicon Fluid SF-69 | 0.05 | 0.05 | 0.05 | 0.05 | 0.05 | 0.05 | 0.05 | 0.05 | 0.05 | 0.05 | | | | |
| Plasticizer 8 | 0.5 | 0.5 | 0.5 | 0.5 | 0.5 | 0.5 | 0.5 | 0.5 | 0.5 | 0.5 | 0.5 | 0.5 | 0.5 | |
| Novec FC-4430 | | | | | | | | | | | 0.05 | | | 0.05 |
| Capstone FS-35 | | | | | | | | | | | | 0.2 | | |
| Capstone FS-3100 | | | | | | | | | | | | | 0.05 | |
| Orasol Black RLI | 3.25 | 3.25 | 3.25 | 3.25 | 3.25 | 3.25 | 3.25 | 3.25 | 3.25 | 3.25 | 3.25 | 3.25 | 3.25 | 3.25 |
| Valifast Orange 3210 | 0.75 | 0.75 | 0.75 | 0.75 | 0.75 | 0.75 | 0.75 | 0.75 | 0.75 | 0.75 | 0.75 | 0.75 | 0.75 | 0.75 |
| Viscosity (cPs) | 0.94 | 0.76 | 0.82 | 0.82 | 0.91 | 0.80 | 1.15 | 0.94 | 1.11 | 0.72 | 0.67 | 0.70 | 0.69 | 0.83 |
| Specific Gravity | 0.85 | 0.85 | 0.847 | 0.850 | 0.840 | 0.838 | 0.848 | 0.843 | 0.838 | 0.840 | 0.839 | 0.837 | 0.837 | 0.842 |

Table 2 illustrates the average dry time, decap time, rub resistance, and kogation performance for the ink formulations in Table 1. The ink compositions were placed in a thermal ink jet cartridge and ink droplets were ejected for extended periods of time. The drop weights were measured periodically using a drop weight tester available from Imtech, Inc. (Corvallis, Oreg.). The onset of kogation is measured as the number of drops fired before the drop weight is consistently reduced by 10% or more from the initial drop weight. It can be seen that all of the ink compositions (except formulations 11903 and 12471) had decap times (as tested by the alternative method of checking for at least 80% presence of a stairstep image) of at least 90 seconds and acceptable rub resistance. Additionally, samples 12418, 12419, 12461, 12463, 12465, 12471, 12589, 12722 and 12723 all were sufficiently resistant to kogation to be able to be fired at least 25 million drops per nozzle of a thermal ink jet printer before a loss in drop weight of 10%.

TABLE 2

| Ink | Decap Time (sec, @ 80% Nozzle Recovery, 'stairstep' image method) | Rub Resistance on Aqueous Coat | Rub Resistance on PET | Kogation = drops fired before 10% drop weight loss onset (million drops) nozzle) | Dry Time (sec) |
|---|---|---|---|---|---|
| 11903 | 15-30 | Good | Good | 10-15 | <5 |
| 12217 | >300 | Good | Good | 5-10 | >5 |
| 12418 | 90 | Good | Good | >25 | <5 |
| 12419 | 120 | Good | Good | >25 | >5 |
| 12461 | 90 | Good | Good | >25 | <5 |
| 12463 | 120 | Good | Fair | >25 | <5 |
| 12464 | 210 | Good | Good | 5 | <5 |
| 12465 | 210 | Good | Good | >25 | >5 |
| 12471 | 15-30 | Good | Good | >25 | <5 |
| 12589 | 60 | Good | Good | >25 | <5 |
| 12721 | 300 | Good | Good | 15-20 | <5 |
| 12722 | 45 | Good | Good | >25 | <5 |
| 12723 | 300 | Good | Good | >25 | <5 |
| 12745 | 60 | Good | Good | >20 | <5 |

Example 2

This example illustrates embodiments of the thermal ink jet ink composition using an ethanol-based solvent. The materials employed in preparing the ink jet ink composition, their amounts in percentage, and the formulation numbers are set forth in Table 3 below. Nobel DLX 3-5 is a cellulose nitrate resin available from Nobel Enterprises. Mowital LPB16H is a polyvinyl butyral resin available from Kuraray America.

TABLE 3

|  | \_\_\_\_\_\_\_\_\_\_ Ink # \_\_\_\_\_\_\_\_\_\_ | | | | | | |
| --- | --- | --- | --- | --- | --- | --- | --- |
|  | 6259 | 6271 | 6272 | 6273 | 6320 | 6321 | 6322 |
| ethanol | 85.45 | 85.45 | 88.45 | 88.45 | 85.35 | 85.35 | 87.35 |
| Propasol P | 6 | 6 | 6 | 6 | 6 | 6 | 6 |
| poly 4-hydroxy styrene |  | 4 |  |  |  | 3 |  |
| Joncryl 682 | 4 |  |  |  | 4 |  |  |
| Nobel DLX 3-5 |  |  | 1 |  |  |  |  |
| Mowital LPB16H |  |  |  | 1 |  |  |  |
| Rit-O-Lit MHP |  |  |  |  |  |  | 1 |
| Super Ester A-75 |  |  |  |  |  | 1 | 1 |
| Plasticizer 8 | 0.5 | 0.5 | 0.5 | 0.5 | 0.5 | 0.5 | 0.5 |
| Silicone Fluid 69 | 0.05 | 0.05 | 0.05 | 0.05 | 0.05 | 0.05 | 0.05 |
| Silwet L7622 |  |  |  |  | 0.1 | 0.1 | 0.1 |
| Orasol Black RLI | 3.25 | 3.25 | 3.25 | 3.25 | 3.25 | 3.25 | 3.25 |
| Valifast Orange 3210 | 0.75 | 0.75 | 0.75 | 0.75 | 0.75 | 0.75 | 0.75 |
| total | 100 | 100 | 100 | 100 | 100 | 100 | 100 |
| Viscosity (cPs) | 1.73 | 1.87 | 1.83 | 1.99 | 1.80 | 2.15 | 1.58 |
| Surface Ten (dynes/cm) | 22.3 | 22.3 | 21.6 | 21.5 | 20.5 | 21.4 | 22.9 |
| pH | 4.71 | 5.79 | 5.95 | 6.25 | 4.88 | 5.79 | 5.39 |
| Specific Gravity | 0.815 | 0.821 | 0.81 | 0.81 | 0.828 | 0.835 | 0.814 |

Table 4 illustrates the % loss in drop weight as a function of the number of drops fired per nozzle for the ink formulations in Table 3, measured as previously described. It can be seen that formula 6259, 6271, and 6322 were sufficiently resistant to kogation to be able to be fired at least 10 million drops per nozzle in a thermal ink jet printer with no more than 10% loss in drop weight.

TABLE 4

| Millions of drops fired per nozzle | \_\_\_\_\_\_\_\_\_\_ % loss in drop weight \_\_\_\_\_\_\_\_\_\_ | | | | | | |
| --- | --- | --- | --- | --- | --- | --- | --- |
|  | 6259 | 6271 | 6272 | 6273 | 6320 | 6321 | 6322 |
| 5M DPN | 3.0% | 3.0% | 1.5% | 17.0% | 4.3% | 7.6% | 9.6% |
| 10M DPN | 10.0% | −2.3% | 13.2% | 46.4% | 16.0% | 14.9% | 7.4% |
| 15M DPN | 22.9% | 2.2% | 12.5% | 51.7% | 24.0% | 14.9% | 7.4% |
| 20M DPN | 30.8% | 9.5% | 3.4% | 54.4% | 27.3% | 15.2% | 6.9% |
| 25M DPN | 43.8% | 7.2% | 15.0% | 56.5% | 42.7% | 22.0% | 14.1% |
| 30M DPN | 41.2% | 17.9% | 22.7% |  |  |  | 12.8% |
| Dry Time (s) | <5 | <5 | <5 | <5 | <5 | <5 | <5 |
| Decap Time (s) | 600 | 300 | 120 | 60 | 120 | 120 | 600 |

Example 3

This example illustrates embodiments of the thermal ink jet ink composition using mixtures of a ketone and alcohol based solvent. The materials employed in preparing the ink jet ink composition, their amounts in percentage, and the formulation numbers are set forth in Tables 5-8 below.

TABLE 5

| | \_\_\_\_\_\_\_\_\_\_ Ink component (weight percentages shown) \_\_\_\_\_\_\_\_\_\_ | | | | | | | |
| --- | --- | --- | --- | --- | --- | --- | --- | --- |
|  | Ink 1 | Ink 2 | Ink 3 | Ink 4 | Ink 5 | Ink 6 | Ink 7 | Ink 8 |
| methyl ethyl ketone |  |  | 56.5 | 66.5 | 46.5 |  |  | 80.1 |
| 2-pentanone | 66.5 | 46.7 |  |  |  |  |  |  |

TABLE 5-continued

| Ink component (weight percentages shown) | Ink 1 | Ink 2 | Ink 3 | Ink 4 | Ink 5 | Ink 6 | Ink 7 | Ink 8 |
|---|---|---|---|---|---|---|---|---|
| 3-pentanone | | | | | | | | |
| 2-heptanone | | | | | | | 66.5 | |
| ethanol SDA-23A | 20.0 | | 20.0 | | | 20.0 | 20.0 | |
| 200 proof ethanol | | 40.0 | | 40.0 | | | | |
| n-propanol | | | | | 20.0 | | | |
| n-butanol | | | 10.0 | | | | | 10.0 |
| n-propyl acetate | | | | | | 66.5 | | |
| Staybelite Ester 10 | 6.8 | 6.8 | 6.8 | 6.8 | 6.8 | 6.8 | 6.8 | 1.5 |
| Ad Pro MTS | | | | | | | | 3.0 |
| CAB 551-0.01 | 1.7 | 1.7 | 1.7 | 1.7 | 1.7 | 1.7 | 1.7 | 0.5 |
| DC205SL | 0.5 | 0.3 | 0.5 | 0.5 | 0.5 | 0.5 | 0.5 | 0.4 |
| DL Black | 4.5 | 4.5 | 4.5 | 4.5 | 4.5 | 4.5 | 4.5 | 4.5 |
| TOTAL | 100.0 | 100.0 | 100.0 | 100.0 | 100.0 | 100.0 | 100.0 | 100.0 |

TABLE 6

| Ink component (weight percentages shown) | Ink 9 | Ink 10 | Ink 11 | Ink 12 | Ink 13 | Ink 14 | Ink 15 | Ink 16 |
|---|---|---|---|---|---|---|---|---|
| MEK | 79.0 | 66.5 | 77.2 | | | | | |
| 2-pentanone | | | | 66.7 | 66.8 | 66.1 | 69.5 | 66.7 |
| ethanol SDA-23A | | | | | | | | |
| 200 proof ethanol | | | | 20.0 | 20.0 | 20.0 | 20.0 | 20.0 |
| n-butanol | | | 10.0 | | | | | |
| n-pentanol | 7.5 | | | | | | | |
| Dowanol PM | | 20.0 | | | | | | |
| Staybelite Ester 10 | 6.8 | 6.8 | 6.8 | 6.8 | 6.8 | 6.8 | 4.4 | 5.0 |
| CAB 551-0.01 | | | | | | | | |
| Vinnol H14/36 | 1.7 | 1.7 | 1.0 | 1.7 | | | | |
| Elvacite 2013 | | | | | 1.7 | | | |
| Elvacite 4055 | | | | | | | | 3.4 |
| Acryloid B-66 | | | | | | | 1.1 | |
| DHX 3/4 | | | | | | 2.3 | | |
| DC205SL | 0.5 | 0.5 | 0.5 | 0.3 | 0.3 | 0.3 | 0.5 | 0.4 |
| DL Black | 4.5 | 4.5 | 4.5 | 4.5 | 4.5 | 4.5 | 4.5 | 4.5 |
| TOTAL | 100.0 | 100.0 | 100.0 | 100.0 | 100.0 | 100.0 | 100.0 | 100.0 |

TABLE 7

| Ink component (weight percentages shown) | Ink 17 | Ink 18 | Ink 19 | Ink 20 | Ink 21 | Ink 22 | Ink 23 | Ink 24 |
|---|---|---|---|---|---|---|---|---|
| methyl ethyl ketone | | 71.2 | 56.7 | 56.7 | 79.1 | 76.5 | 76.5 | |
| 2-pentanone | 67.2 | | | | | | | 67.5 |
| SDA-23A | 20 | | | | | | | |
| SDA-3C | | | | | | | | 20.0 |
| 200 proof ethanol | | | 20.0 | 20.0 | | | | |
| n-butanol | | 10 | 10.0 | 10.0 | 10.0 | 10.0 | 10.0 | |
| Ad Pro MTS | | | | | 3.0 | | | |
| Staybelite Ester 10 | 6.8 | 6.8 | 6.8 | 6.8 | | | | 6.0 |
| Superester A-75 | | | | | 3.0 | | | |
| Foral AX | | | | | | 6.8 | | |
| Tego TC | | | | | | | 6.8 | |
| CAB 551-0.01 | 1.7 | 1.7 | 1.7 | 1.7 | | 1.7 | 1.7 | |
| CAB 321-0.1 | | | | | | | | 1.5 |
| DC205SL | 0.5 | 0.5 | | | 0.4 | 0.5 | 0.5 | 0.5 |
| Fluorolink E10 | | | 0.3 | | | | | |
| Silwet L7622 | | | | 0.3 | | | | |
| DL Black | | 9.8 | 4.5 | 4.5 | 4.5 | 4.5 | 4.5 | 4.5 |
| Valifast Black 3808 | 3.0 | | | | | | | |
| Valifast Orange 3210 | 0.8 | | | | | | | |
| TOTAL | 100.0 | 100.0 | 100.0 | 100.0 | 100.0 | 100.0 | 100.0 | 100.0 |

TABLE 8

| | Ink component (weight percentages shown) | | | | | | | |
|---|---|---|---|---|---|---|---|---|
| | Ink 25 | Ink 26 | Ink 27 | Ink 28 | Ink 29 | Ink 30 | Ink 31 | Ink 32 |
| methyl ethyl ketone | 78.6 | 80.1 | | | | 75.1 | | 75.5 |
| Dowanol PnP | 11 | | | | | | | |
| diacetone alcohol | 2 | | | | | | | |
| 2-pentanone | | | | 69.8 | | | | |
| 2-pentanone, pure | | | 70.7 | | 70.7 | | 69.6 | |
| n-butanol | | 10 | | | | 10.0 | | 10.0 |
| SDA3C | | | 20.0 | 20.0 | 20.0 | | 20.0 | |
| Ad Pro MTS | 2.5 | 3 | 1.8 | 1.5 | 1.8 | 3.0 | 3.0 | 3.0 |
| Dertophene T | 1.5 | 1.5 | | 1.5 | 1.2 | 3.0 | 3.0 | 3.0 |
| YS T145 | | | 1.2 | | | | | |
| K-plast 1022 | | | 1.2 | 2.1 | 1.2 | 3.9 | 3.7 | 3.9 |
| CAB 551-0.01 | | 0.5 | | | | | | |
| Plasticizer 8 | 0.5 | | | | | | | |
| DC205SL | | 0.4 | 0.2 | 0.2 | 0.2 | 0.5 | 0.2 | |
| Silwet L7622 | 0.1 | | | | | | | |
| Silicone fluid 69 | 0.05 | | | | | | | 0.1 |
| BYK-065 | | | 0.4 | 0.4 | 0.4 | | 0.5 | |
| DL Black | | 4.5 | 4.5 | 4.5 | 4.5 | 4.5 | | 4.5 |
| Valifast Black 3840 | | | | | | | 6.5 | |
| Valifast Black 3808 | 3.0 | | | | | | | |
| Valifast Orange 3210 | 0.75 | | | | | | | |
| TOTAL | 100.0 | 100.0 | 100.0 | 100.0 | 100.0 | 100.0 | 106.5 | 100.0 |

2-pentanone (methyl propyl ketone) is industrial grade with up to 10% methylisobutylketone. 2-pentanone, is pure 2-pentanone (>98%); Propasol P; Propasol PM; CAB551-0.01 and CAP 321-0.1 (a cellulose ester) are available from Eastman Chemical Company. N-propanol, 3-pentanone (diethyl ketone) and 2-heptanone, n-pentanol, n-propyl acetate are available from Aldrich Chemical Company. SDA-23A, SDA-3C and 200 proof ethanol are available from Equistar Chemicals LP. N-Butanol is available from Amoco Chemical, Inc. Dowanol PnP and PM are available from Dow Chemical, Inc. DL Black is Solvent Black 29 available from Hubei Dinglong Chemical Company, Ltd. Valifast Black 3808 and Valifast Black 3840 are available from Orient Chemical, Inc. Tego TC is a ketone-aldehyde resin available from Evonik, Inc. Fluorolink E10 is available from Solvay-Solexis, Inc. See definitions for sources of remaining materials used.

The composite adhesion score is the average score of a rub adhesion test and a scratch adhesion test. Images were printed on a BOPP film substrate that is commercially used for packaging confectionaries. The rub adhesion was tested as follows. A controlled-weight rub tester was constructed using a conventional art gum eraser tightly covered by a thin leather chamois material. The covered eraser was affixed to the bottom of a 1 kilogram steel weight. The leather surface with a constant 1.0×0.5 inch contact area was then brought into contact with a 1-inch printed code in a controlled manner by holding the weight loosely by hand and allowing only gravity to apply the downward force. With the printed substrate on a hard, flat wooden surface the rub tester was moved back-and-forth fully across the code at a rate of two repetitions per second for a total of 20 back-and-forth repetitions or until the image lost adhesion. A failure was defined as any section of the code becoming illegible and the number of rubs at the point of failure was recorded. At least two printed codes were tested to provide the average result.

The scratch adhesion test was performed as follows. With the printed substrate on a hard, flat table a fingernail was dragged across the image towards the body such that the inside of the fingernail was the primary point of contact. When doing this, roughly 1 kg of pressure was applied with the finger. The motion of pulling a fingernail across the image following the same path was performed 10 times in sequence. Again, a failure was defined as any section of the image becoming illegible and the number of scratches at the point of failure was recorded. At least 2 printed codes were tested to provide the average result. Unless otherwise stated, both rub and scratch testing were performed on codes samples that had dried at least one hour.

Print sample were also made onto SBS coated paper cardstock at a throw distance of about 1 mm to check the print quality and decap using the aforementioned 2-D barcode readability method. This method is more difficult to pass than the method described in previous examples because it does not allow for any substantial loss of the integrity of the first two columns of print which serve to define the leading edge of a typical 2-D Datamatrix barcode (codes would not otherwise be readable). As described above, codes were read using an LVS 9505 Barcode verifier.

Table 9 illustrates the viscosity, average dry time, decap time, rub adhesion, scratch adhesion, and composite adhesion for the ink formulations in Tables 5-7. It can be seen that each of the ink compositions showed a decap time of at least 10 seconds and a composite adhesion score of at least 4.7. A score of 5 was considered acceptable adhesion, with some achieving scores above 7 indicating excellent adhesion.

TABLE 9

| Ink | Ink Viscosity cp | Dry time sec. | Decap time, by 2-D barcode readability method sec. | BOPP rub adhesion Average score | BOPP scratch adhesion Average score | Average composite adhesion |
|---|---|---|---|---|---|---|
| 1 | 1.2 | 2 | 25 | 9 | 9 | 9.2 |
| 2 | 1.6 | 3 | 50 | 7 | 8 | 7.4 |
| 3 | 1.0 | 2 | 40 | 8 | 8 | 8.2 |
| 4 | 1.0 | 2 | 40 | 6 | 8 | 7.2 |
| 5 | 1.2 | 3 | 15 | 8 | 5 | 6.4 |
| 6 | 1.8 | 4 | 25 | 9 | 8 | 8.2 |
| 7 | 1.8 | 10+ | 20 | 7 | 10 | 8.3 |
| 8 | 0.8 | 2 | 15 | 8 | 5 | 6.5 |

TABLE 9-continued

| Ink | Ink Viscosity cp | Dry time sec. | Decap time, by 2-D barcode readability method sec. | BOPP rub adhesion Average score | BOPP scratch adhesion Average score | Average composite adhesion |
|---|---|---|---|---|---|---|
| 9 | 1.0 | 2 | 20 | 7 | 6 | 6.6 |
| 10 | 1.2 | 3 | 15 | 9 | 9 | 9.0 |
| 11 | 0.9 | 3 | 15 | >10 | 6 | 8.0 |
| 12 | 1.3 | 4 | 11 | >10 | 4 | 7.0 |
| 13 | 1.2 | 3 | 30 | 9 | 6 | 7.4 |
| 14 | 1.5 | 4 | 30 | 5 | 4 | 4.7 |
| 15 | 1.1 | 3 | 30 | 10 | 4 | 6.7 |
| 16 | 0.9 | 2 | 20 | 6 | 10 | 8.0 |
| 17 | 1.3 | 2 | 40 | 9 | 4 | 6.1 |
| 18 | 1.2 | 2 | 11 | >10 | 4 | 7.0 |
| 19 | 1.3 | 4 | 30 | 10 | 8 | 9.0 |
| 20 | 1.4 | 4 | 15 | 10 | 6 | 8.1 |
| 21 | 0.7 | 3 | 50 | 10 | 5 | 7.5 |
| 22 | 1.0 | 2 | 11 | 8 | 8 | 8.0 |
| 23 | 1.1 | 2 | 15 | 6 | 8 | 6.9 |
| 24 | 1.4 | 3 | 11 | 10 | 7 | 8.8 |

It is well known that TIJ cartridges can easily be physically degraded by chemical attack by strong solvents such as MEK and MPK. The decap performance of these cartridges is most sensitive to this form of chemical degradation. To demonstrate that this degradation is not occurring for these inks, the change in decap between initial and aged cartridges after resting at room temperature can be compared. The performance of inks from Table 8 as well as selected ink Examples from the prior tables are summarized in Table 10. The fact that decap times do not decline for most inks demonstrates that solvent-induced degradation is not occurring.

TABLE 10

| Ink | Dry time, BOPP sec. | Decap time, by 2-D barcode readability, initial sec. | Decap time, by 2-D barcode readability, after resting at RT sec. | Cartridge age (resting period at RT) as indicated |
|---|---|---|---|---|
| 1 | <2 | 20 | 40 | >1 year |
| 8 | <1.5 | 15 | 20 | 9 mo |
| 10 | <2 | 15 | 30 | >1 year |
| 25 | <5 | >90 | >90 | >1 year |
| 26 | <2 | >90 | >90 | >6 mo |
| 27 | <1.5 | 60 | 75 | >3 mo |
| 28 | <2 | >90 | 90 | >3 mo |
| 29 | <2 | >90 | >90 | 3 mo |
| 30 | <2 | 50 | 30 | >6 mo |
| 31 | <2 | >90 | 75 | >6 mo |
| 32 | <2 | 90 | 40 | 3 mo |

The aforementioned method of using a rub-tester provides a good way to perform consistent rubbing tests. However, tests can also be conducted by using a human thumb which has the advantage that it is the most representative of how actual end-users will perform their own adhesion tests. For rub tests shown in Table 11 below, a human thumb was pressed with constant pressure unidirectionally in a wiping motion across the codes. Roughly 2 kilograms of pressure was applied. The thumb was wiped along the same path for 10 times in sequence. Again, a failure was defined as any part of the image becoming illegible and the number of rubs at the point of failure was recorded. At least 2 printed codes were tested to provide the average result. The BOPP wetting and adhesion of the same inks from Table 9 are set forth in Table 11.

TABLE 11

| Ink | Hard thumb rub, 1 min. BOPP Average score | BOPP, wetting score (1 = best, 5 = worst) | BOPP rub adhesion, after 1 hour Average score | BOPP scratch adhesion Average score | Average composite adhesion (1+ hour) |
|---|---|---|---|---|---|
| 1 | 5 | 2 | 10 | 8 | 9.0 |
| 8 | 5 | 2 | 8 | 5 | 6.5 |
| 10 | 7 | 3 | 8 | 10 | 9.0 |
| 25 | 2 | 3 | >10 | 8 | 9.0 |
| 26 | 4 | 4 | 5 | 6 | 5.5 |
| 27 | 3 | 3 | 3 | 5 | 4.0 |
| 28 | 6 | 4 | 4 | 8 | 6.0 |
| 29 | 5 | 3 | 5 | 5 | 5.0 |
| 30 | 8 | 3 | 7 | >10 | 8.5 |
| 31 | 7 | 4 | 4 | 8 | 6.0 |
| 32 | 7 | 4 | >10 | 9 | 9.5 |

As can be seen in Table 11, most of the inks show a combination of good initial (1 minute) thumb rub resistance as well as good wetting, post-1-hour rub and scratch resistance on BOPP film. A composite adhesion score of at least 5.0 was achieved for each formulation. Particularly advantageous examples—such as Ink #32—were those that scored well for decap, dry time, 1 minute rub resistance and also on the composite adhesion score. However, inks according to the current invention might be selected for any combination of these benefits based on what is required.

Figure 1:
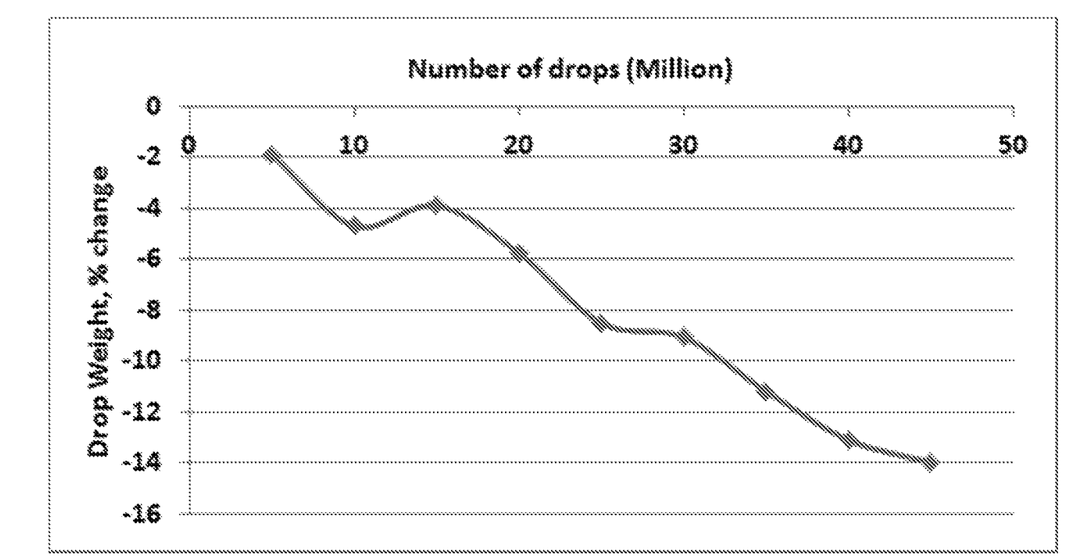
FIG. 1 is a chart showing the kogation properties of an inventive ink.

To demonstrate that good kogation performance can be achieved for humectant-free TIJ inks, a kogation test was performed on Ink #3 over a total of 45 million drops (See FIG. 1). FIG. 1 shows the % change in drop weight as a function of the number of drops printed. The total loss in drop mass was less than 10% at greater than 25 million drops and only 14.0% after 45 million drops. Ink #3 also achieved an acceptable decap period of 40 seconds and a measured dry time of 2 seconds, with very good adhesion to BOPP film.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A thermal ink jet ink composition comprising:
   (a) one or more volatile organic solvents, wherein the one or more volatile organic solvents are selected from the group consisting of $C_1$-$C_4$ alcohols, $C_3$-$C_6$ ketones, and mixtures thereof, and wherein the one or more volatile organic solvents are present in an amount at least 60% by weight of the ink composition;
   (b) one or more binder resins, wherein the one or more binder resins are present in an amount from 1% to 10% by weight of the ink composition; and
   (c) one or more dyes,
wherein if water is present, it is present in amount less than 5% by weight of the ink composition,
wherein the ink composition is free of humectants,
wherein the ink composition is suitable for use in a thermal ink jet printer,
wherein the ink composition has a viscosity below 2 cPs at 25° C.,
wherein the one or more volatile organic solvents comprise: methyl ethyl ketone, methyl n-propyl ketone, methyl isopropyl ketone, diethyl ketone or any combination thereof and 1-propanol, 2-propanol, n-butanol, or any combination thereof; or
   the one or more volatile organic solvents comprise: methyl n-propyl ketone, methyl isopropyl ketone, diethyl ketone, or any combination thereof and ethanol; and
wherein
   (i) at least one of the one or more binder resins is a urethane resin, or
   (ii) at least one of the one or more binder resins is a terpene phenolic resin, or
   (iii) the one or more binder resins are selected from the group consisting of cellulose ester resins, rosin ester resins, modified rosin esters, cellulose nitrate resins, polyamide resins, acrylic resins, polyvinyl butyral resins, vinyl resins, polyhydroxystyrene resins, silicone resins, sulfonamide-modified epoxy resins, sulfonamide-modified formaldehyde resins, sulfonamide-modified melamine formaldehyde resins, polyketone-aldehyde resins and combinations thereof.

2. The thermal ink jet ink composition of claim 1, wherein the one or more binder resins comprise a cellulose ester resin with a rosin ester resin or terpene phenolic resin.

3. The thermal ink jet ink composition of claim 1, wherein the one or more binder resins comprise an acrylic resin and a rosin ester resin.

4. The thermal ink jet ink composition of claim 1, wherein the one or more binder resins comprise a sulfonamide-modified epoxy resin with a rosin ester resin or terpene phenolic resin.

5. The thermal ink jet ink composition of claim 1, wherein the one or more binder resins comprise a sulfonamide-modified epoxy resin, a cellulose ester resin, and a terpene phenolic resin.

6. The thermal ink jet ink composition of claim 1, wherein the one or more binder resins comprise a sulfonamide-modified epoxy resin, a polyurethane and a terpene phenolic resin.

7. The thermal ink jet ink composition of claim 1, wherein the one or more binder resins comprise a cellulose ester resin, a sulfonamide-modified epoxy resin and a rosin ester resin.

8. The thermal ink jet ink composition of claim 1 wherein the cellulose ester resin, if present, has a weight average molecular weight less than 50,000.

9. The thermal ink jet ink composition of claim 1 wherein the cellulose ester resin, if present, has a glass transition temperature less than 160° C.

10. The thermal ink jet ink composition of claim 1, wherein the one or more volatile organic solvents comprise methyl ethyl ketone and/or 2-pentanone present in an amount greater than 70% by weight of the composition.

11. The thermal ink jet ink composition of claim 1, wherein the one or more volatile organic solvents comprise ethanol and/or n-butanol present in an amount between 5% and 20% by weight of the ink composition.

12. The thermal ink jet ink composition of claim 1, wherein the one or more volatile organic solvents comprise methyl ethyl ketone and one or both of ethanol and n-butanol present in an amount greater than 40% by weight of the ink composition.

13. The thermal ink jet ink composition of claim 1, wherein the one or more volatile organic solvents comprise n-butanol in an amount greater than 5% by weight of the ink composition.

* * * * *